United States Patent
Chen et al.

(10) Patent No.: US 10,920,893 B2
(45) Date of Patent: Feb. 16, 2021

(54) CAGE RESET PLANETARY ROLLER SCREW DEVICE

(71) Applicant: Zibo Votaisi Petrochemical Equipment Co., Ltd, Zibo (CN)

(72) Inventors: Jimeng Chen, Zibo (CN); Xiaoqi Liu, Cambridge (GB); Xiaoxuan Liu, Beijing (CN)

(73) Assignee: Zibo Votaisi Petrochemical Equipment Co., Ltd, Shandong (CN)

( * ) Notice: Subject to any disclaimer, the term of this patent is extended or adjusted under 35 U.S.C. 154(b) by 0 days.

(21) Appl. No.: 16/599,834

(22) Filed: Oct. 11, 2019

(65) Prior Publication Data

US 2020/0041010 A1 Feb. 6, 2020

Related U.S. Application Data

(63) Continuation-in-part of application No. 16/516,331, filed on Jul. 19, 2019, now Pat. No. 10,859,169, which is a continuation of application No. PCT/CN2019/084917, filed on Apr. 29, 2019, which is a continuation of application No. 15/872,000, filed (Continued)

(30) Foreign Application Priority Data

May 26, 2016 (CN) .......................... 2016 2 0491127
May 3, 2018 (CN) .......................... 2018 1 0412883

(51) Int. Cl.
*F16K 5/20* (2006.01)
*F16H 25/22* (2006.01)
*F16K 31/53* (2006.01)

(52) U.S. Cl.
CPC .......... *F16K 5/204* (2013.01); *F16H 25/2252* (2013.01); *F16K 5/201* (2013.01); *F16K 31/535* (2013.01)

(58) Field of Classification Search
CPC .... F16K 5/201; F16K 31/535; F16H 25/2252; F16H 25/2247; F16H 25/2266; F16H 2025/228
See application file for complete search history.

(56) References Cited

U.S. PATENT DOCUMENTS 3,033,513 A   5/1962  Vulliez
4,655,100 A * 4/1987  Frederick ............ F16H 25/2252
                                                    74/424.92

(Continued)

FOREIGN PATENT DOCUMENTS

WO    WO-2016062357 A1 *  4/2016  ......... F16H 25/2015

*Primary Examiner* — David Colon-Morales
(74) *Attorney, Agent, or Firm* — Larson & Larson, P.A.; Justin P. Miller; Frank Liebenow

(57) ABSTRACT

The present disclosure relates to a cage reset planetary roller screw device comprising a male thread member provided with a male thread and a female thread member provided with a female thread, a number of planetary rollers disposed between the male thread and the female thread. The planetary rollers are disposed between the male thread and the female thread through a cage, and the planetary rollers are disposed in roller retaining pockets of the cage. The side surfaces of the cage are provided with convex ends. The male thread member and/or the female thread member are provided with limit blocks that are in contact with the convex ends of the cage in the circumferential direction of the cage.

10 Claims, 16 Drawing Sheets

Related U.S. Application Data on Jan. 16, 2018, now Pat. No. 10,415,711, which is a continuation of application No. 15/678,507, filed on Aug. 16, 2017, now Pat. No. 9,903,483, which is a continuation of application No. PCT/CN2017/080179, filed on Apr. 12, 2017.

(56) References Cited

U.S. PATENT DOCUMENTS

| | | | |
|---|---|---|---|
| 4,846,007 A * | 7/1989 | Weyer | F15B 15/068 |
| | | | 74/424.92 |
| 5,417,404 A | 5/1995 | Varden | |
| 6,378,841 B1 | 4/2002 | Russell | |
| 6,791,215 B2 * | 9/2004 | Tesar | F16H 25/205 |
| | | | 310/12.24 |
| 7,740,228 B2 | 6/2010 | Simpson | |
| 8,701,834 B2 * | 4/2014 | Jacob | F16H 57/0471 |
| | | | 184/6.12 |
| 9,746,098 B2 * | 8/2017 | Dubus | F16K 31/50 |
| 9,903,483 B2 | 2/2018 | Liu | |
| 10,378,622 B2 * | 8/2019 | Boch | F16H 25/2252 |
| 2005/0160856 A1 * | 7/2005 | Sugitani | F16H 25/2252 |
| | | | 74/424.92 |

* cited by examiner

CAGE RESET PLANETARY ROLLER SCREW DEVICE

CROSS-REFERENCE TO RELATED APPLICATION

This application is a continuation-in-part of U.S. patent application Ser. No. 16/516,331, filed Jul. 19, 2019, titled "Valve seat driven forced seal ball valve" and a continuation of PCT/CN2019/084917, filed Apr. 29, 2019, titled "Cage reset planetary roller screw device," that claims priority to Chinese Patent Application No. 201810412883.5, filed on May 3, 2018, title translated as "Cage reset planetary roller screw device.

U.S. patent application Ser. No. 16/516,331 is in turn a continuation of U.S. patent application Ser. No. 15/872,000, filed Jan. 16, 2018, titled "A mechanical energized sealing ball valve with single stem," which is in turn a continuation of U.S. patent application Ser. No. 15/678,507, filed Aug. 16, 2017, titled "A mechanical energized sealing ball valve", issued on Feb. 27, 2018, as U.S. Pat. No. 9,903,483, which a continuation of PCT application number PCT/CN2017/080179, filed Apr. 12, 2017, title translated as "Forced Sealing Ball Valve," which in turn claims priority to China application number ZL 2016 20491127.2, filed May 26, 2016, title translated as "Forced Sealing Ball Valve."

FIELD

The present disclosure pertains to a screw driven device, and more particularly to a cage reset planetary roller screw device.

BACKGROUND

In the field of fluid control, oil and gas production process switching, pipeline shut-off, metering, pressure regulation, molecular sieve switching, compressor inlet and outlet, hydrogen application in refinery processes, air separation of ammonia plant, etc. all require frequent operations and rigorous control over fluid switching and require the absolute tightness of closure. In these applications, the valve is required to produce as small a pressure drop as possible in a through-conduit port and to provide a forced torque seal that is unaffected by the line pressure. Forced seal ball valves are recognized as the ideal solution. One of the related technologies uses a screw-driven forced seal ball valve to achieve a mechanically energized seal between the ball and the valve end-connection by a screw jacking method. However, when applied to a large-diameter high-pressure pipe, the ball is subjected to a high pressure, and a large frictional force is generated at the contact surface of the thread, which causes an increase in the opening and closing operation torque of the valve and thus, difficulty in operation and a severe reduction in the working life of the thread. The use of planetary roller screw is the way to solve this technical problem. The normal planetary roller screw requires a rail change slot. However, for a forced seal ball valve, since the rotation angle of the drive thread is small, usually not more than 360°, the rail change slot is no longer a necessary structure. However, during the reciprocating rotation of the planetary roller screw device, due to factors such as poor manufacturing precision and working environment, the precise positional relationship between the male thread and the female thread cannot be guaranteed during the movement of the planetary roller. After repeated reciprocating rotations, the resulting accumulation of roller position changes causes an axial offset between the planetary roller and the cage. When this axial offset accumulates to a certain extent, the cage will be in contact with the male thread member or the female thread member, causing issues or failures while the male thread member or the female thread is rotating.

For another type of seat driven forced seal ball valve, the male threaded seat is driven via planetary roller by the seat driven wheel with female thread to move linearly against the stationary ball and thus, to achieve forced seal against the stationary ball. The operation principle of the planetary roller screw mechanism applied to this type of valve is basically the same as the previous valve with valve sealing member being driven by planetary roller screw to build a mechanical seal against the seat. Due to poor manufacturing precision and working environment, the precise positional relationship between the planetary roller and the male thread and the female thread cannot be guaranteed during the rotation. The accumulated roller position changes caused by the back and forth rotation causes the planetary roller and the cage to be axially offset. When this axial offset accumulates to a certain extent, the cage will contact against the male thread member or the female thread member, causing issues or failures while the male thread member or the female thread is rotating.

What is needed is means of maintaining the roller cage in position during operation.

SUMMARY

The present disclosure is to provide a technical solution to resetting the cage of a planetary roller screw device in order to maintain the planetary roller in a proper working position between the male and female thread members.

In order to achieve the above objective, the technical solution of the present disclosure is: a cage reset planetary roller screw device, comprising a male thread member provided with a male thread and a female thread member provided with a female thread, where the pitch of the male thread and the female thread is the same, a number of planetary rollers are disposed between the male thread and the female thread, the planetary roller is provided with ring grooves with its spacing being the same as the pitch of the male thread member and the female thread member, and the ring grooves of the planetary roller meshes with the male threads and the female threads respectively. The planetary rollers are held in position by a cage that is disposed between the male and the female threads, and are disposed in roller retaining pockets of the cage. The cage is provided with a convex end, and the male thread member and/or the female thread member are provided with a limit block which is in contact with the convex end of the cage in the circumferential direction of the cage.

Further, the cage may be provided with a convex end on one side; one surface of the cage is the first side surface, where the first side surface is provided with a first convex end, and the limit block disposed at the male thread member or the female thread member is the first limit block, which is in contact with the first convex end of the cage in the circumferential direction of the cage.

Further, the cage may be provided with a convex end on both sides; the sides of the cage are respectively the first side surface and the second side surface, where the first side surface is provided with a first convex end and the second side surface is provided with a second convex end, and the first convex end and the second convex end are oriented opposite to each other in the circumferential direction of the cage. The male thread member is provided with a first limit block, and the female thread member is provided a second limit block, where the first limit block of the male thread member is in contact with the first convex end in the circumferential direction of the cage, and the second limit block of the female thread member is in contact with the second convex end in the circumferential direction of the cage.

Further, the length of the roller retaining pockets corresponds to the length of the planetary rollers.

Furthermore, the side surfaces of the cage are spiral surfaces.

Furthermore, each side surface of the cage is a spiral surface corresponding to the male or female thread.

Further, the cage reset planetary roller screw device is disposed in a forced seal ball valve. The forced seal ball valve includes a seat and a ball assembly, where the ball assembly includes a ball and a sealing member, and the ball is provided with a screw driven wheel. The screw driven wheel is driven via the cage reset planetary roller screw device to press the sealing member against and the seat.

Further, the cage reset planetary roller screw device is disposed in a forced seal ball valve including a ball, a first seat and a first driving wheel. The first driving wheel drives the first seat to press against the ball via the cage reset planetary roller screw device.

The disclosure has the advantages that:

Since the male thread and the female thread take one-way rotational loads, the cage is pushed to accurately reset the planetary roller during the non-load rotation stroke, so that the planetary roller maintains the correct initial working position between the male thread and the female thread, ensuring good working condition of the planetary roller screw. The structure is simple and practically effective.

The present disclosure will be described in detail below with reference to the accompanying drawings and embodiments.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
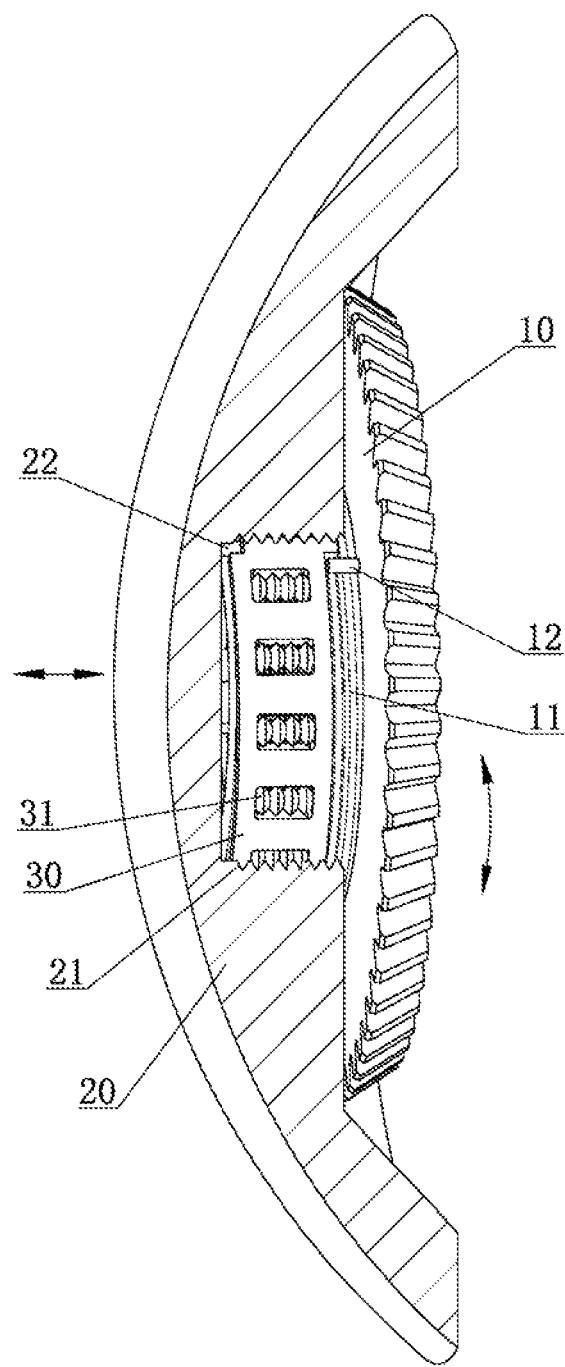
FIG. 1 is a structural view of the present disclosure.

Reference will now be made in detail to the presently preferred embodiments of the invention, examples of which are illustrated in the accompanying drawings. Throughout the following detailed description, the same reference numerals refer to the same elements in all figures.

Figure 2:
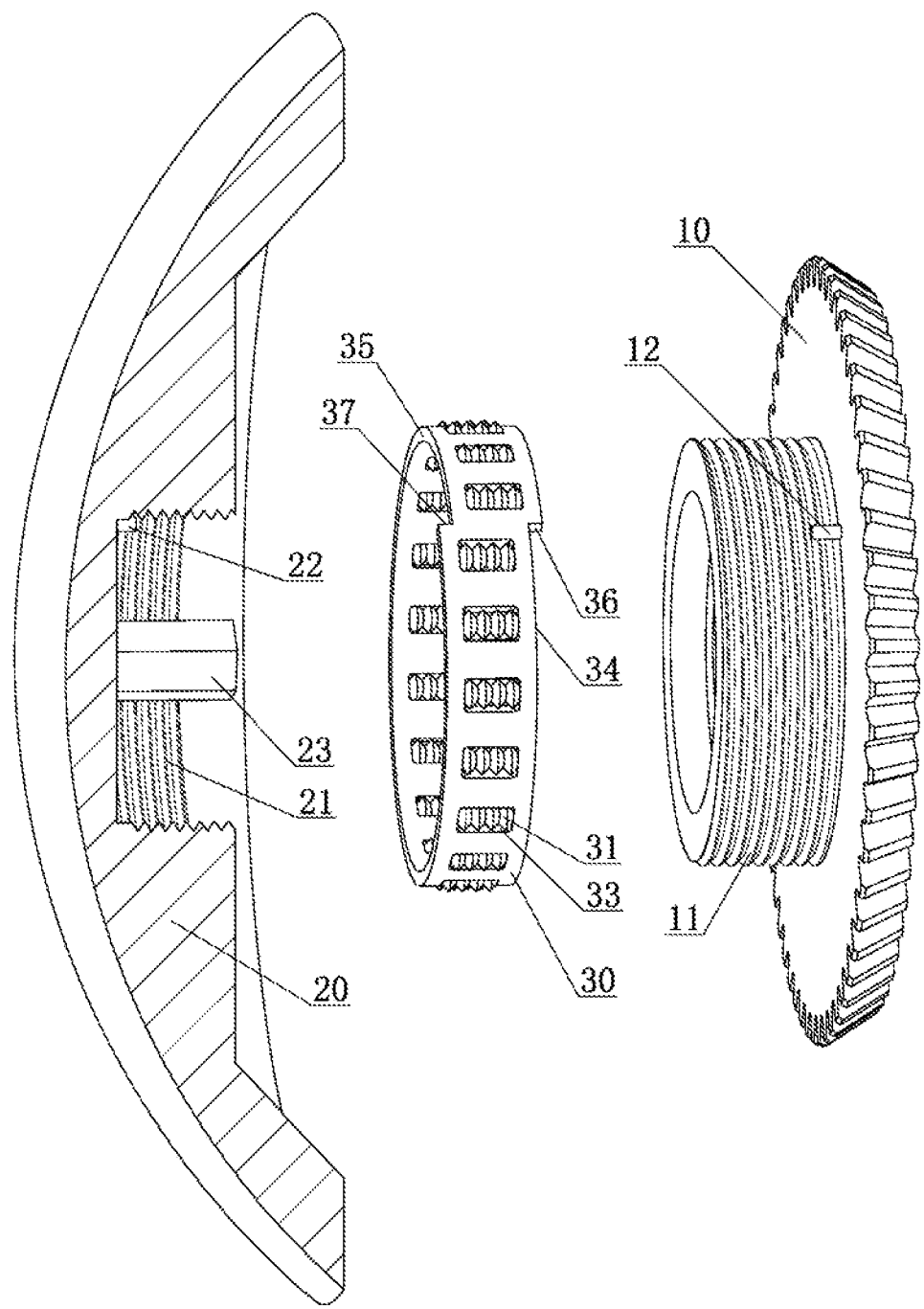
FIG. 2 is an exploded view of the structure of the present disclosure.
Figure 3:
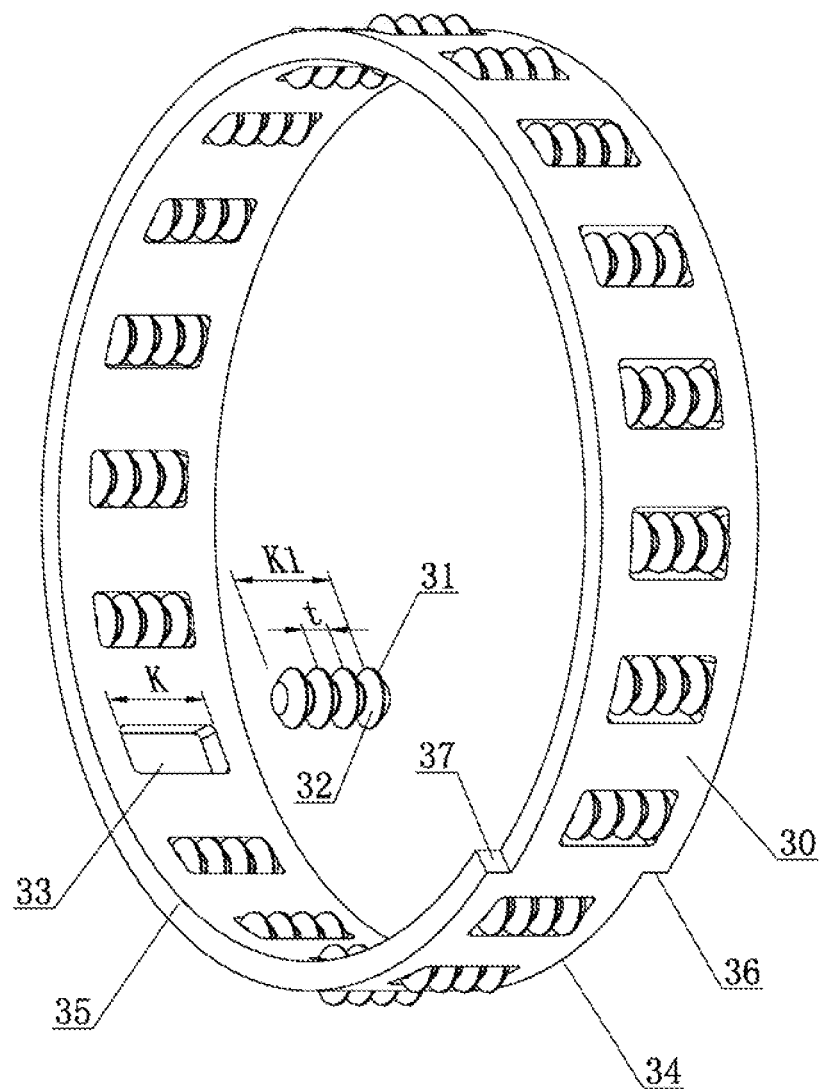
FIG. 3 is a structural view of the cage and the planetary rollers of the present disclosure.

As shown in FIGS. 1 to 3, a cage reset planetary roller screw device includes a male thread member 10 provided with a male thread 11 and a female thread member 20 provided with a female thread 21, where the pitch of the male thread and that of the female thread are the same. A number of planetary rollers 31 are disposed between the male thread and the female thread, and are provided with ring grooves 32 with the groove distance t being the same as the said pitch. The ring grooves of the planetary rollers are respectively meshed with the male thread and the female thread. The planetary rollers are disposed between the male thread and the female thread via a cage, and are disposed in the roller retaining pockets 33 of the cage. The side surface of the cage is provided with a convex end, or limit stop surface (36 or 37 in the Figures). The male thread member and/or the female thread member is provided with a limit block (12 or 22 in the Figures). The limit block is in contact with the convex end of the cage in the circumferential direction of the cage. The interaction of the limit stop surfaces 36/37 and limit blocks 12/22 limit rotation of the roller cage to a set angular distance, or distance along an arc. By limiting the rotation of the roller cage, the linear movement of the roller cage along the length of the threads is correspondingly limited. Thus, the roller cage is prevented from creeping, or "walking" ever-further along the length of the threads and degrading valve performance.

Figure 4:
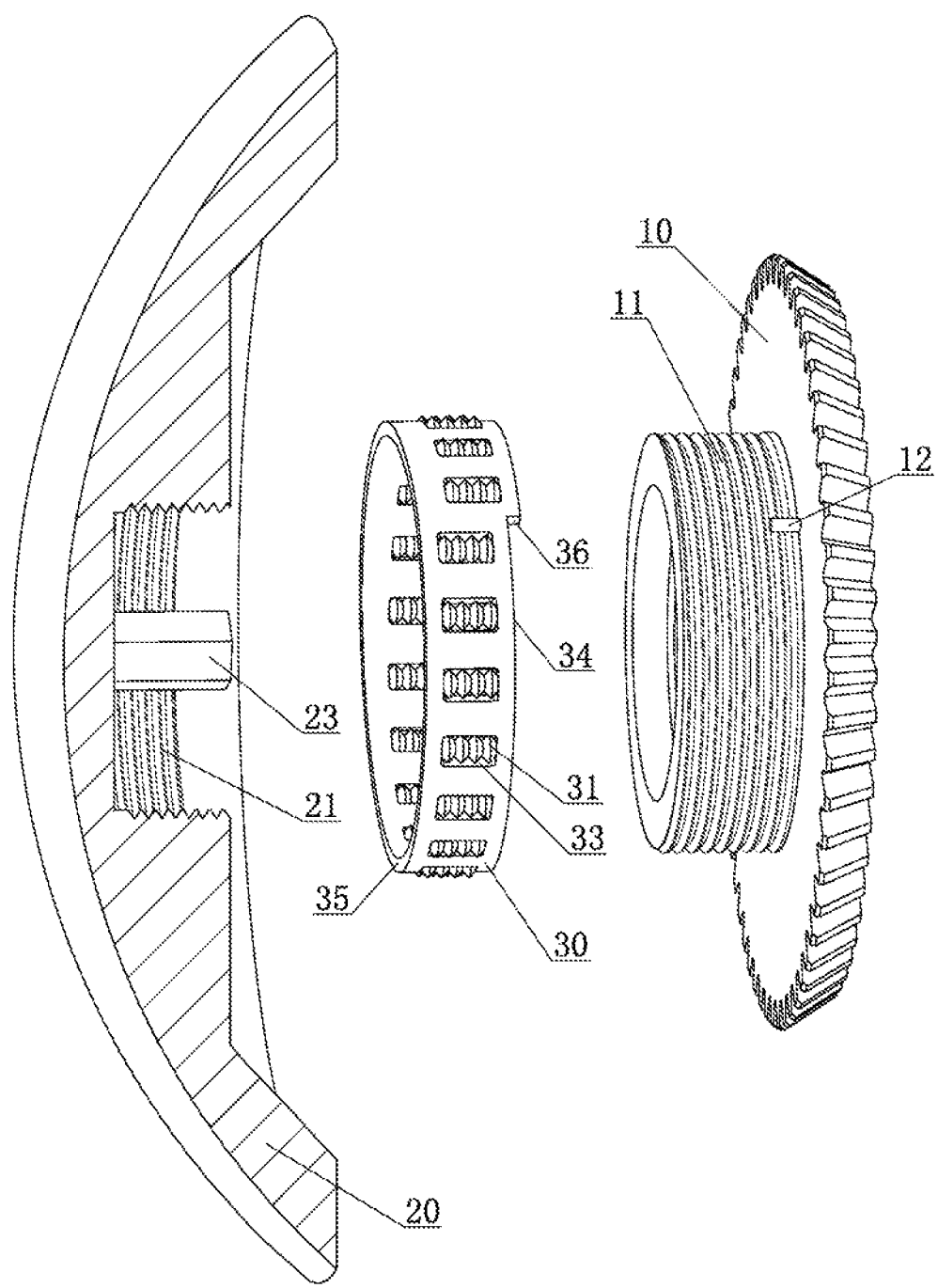
FIG. 4 is an exploded view of the cage of the present disclosure provided with a convex end on one side, and the female thread member is provided with a first limit block.
Figure 5:
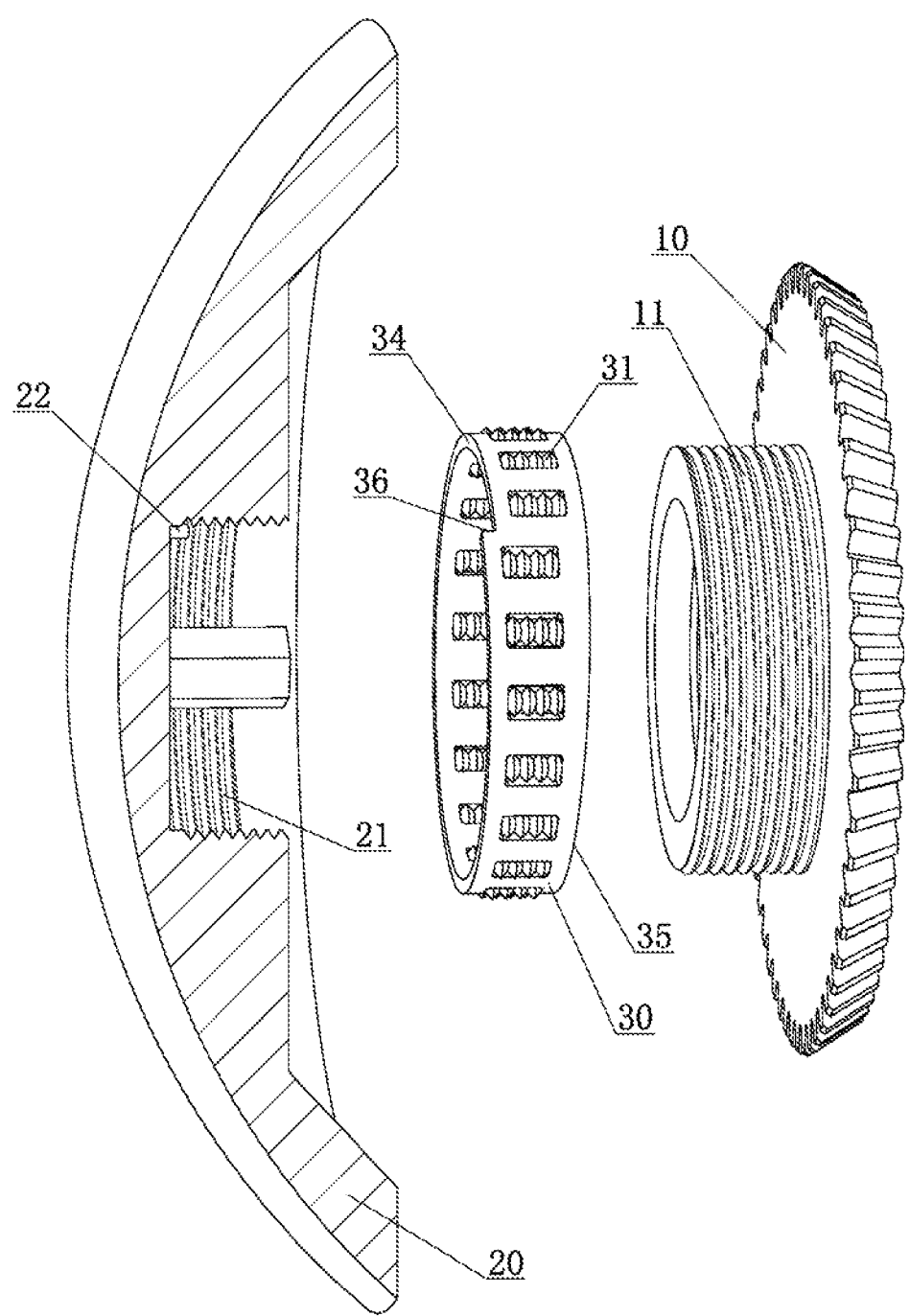
FIG. 5 is an exploded view of the cage of the present disclosure provided with a convex end on one side, and the male thread member is provided with a first limit block.

The cage may be provided with a convex end on one side. As shown in FIGS. 4 and 5, one side surface of the cage is a first side surface 34, and the first side surface is provided with a first convex end 36. The limit block is a first limit block (12 in FIG. 4 or 22 in FIG. 5) provided on the male thread member or the female thread member. The first limit block is in contact with the convex end of the cage in the circumferential direction of the cage.

The cage may be provided with a convex end on both sides. As shown in FIGS. 1 to 3, the two sides of the cage are respectively the first side surface 34 and the second side surface 35, where the first side surface is provided with a first convex end 36, and the second side surface is provided with a second convex end 37. The first convex end and the second convex end are oriented opposite to each other in the circumferential direction of the cage. The male thread member is provided with a first limit block 12, and the female thread member is provided with a second limit block 22; the first limit block of the male thread member is in contact with the first convex end in the circumferential direction of the cage, and the second limit block is of the female thread member is in contact with the second convex end in the circumferential direction of the cage. In fact, the first side surface of the cage and the first convex end are the counterparts of the second side surface and the second convex end, so can be interchangeably defined or used, that is, the first convex end may correspond to the second limit block and touches the second limit block, and the second convex end may correspond to the first limit block and touches the first limit block.

The length of the roller retaining pockets corresponds to the length of the planetary rollers. The meaning of "corresponds to" is that the length K of the roller retaining pockets is slightly larger than the length K1 of the planetary rollers, so that there is a gap left between each roller retaining pocket and the two ends of the corresponding planetary roller, allowing the planetary rollers to rotate freely within the roller retaining pockets without sliding incorrectly in the axial direction. Based on experience, it is a decent choice to set the length of the roller retaining pockets as 1.1 times the length of the planetary rollers, or the former as 0.2 mm to 1.0 mm greater than the latter.

The side surfaces of the cage are spiral surfaces.

More specifically, each side surface of the cage is a spiral surface corresponding to the male or the female thread.

Figure 9:
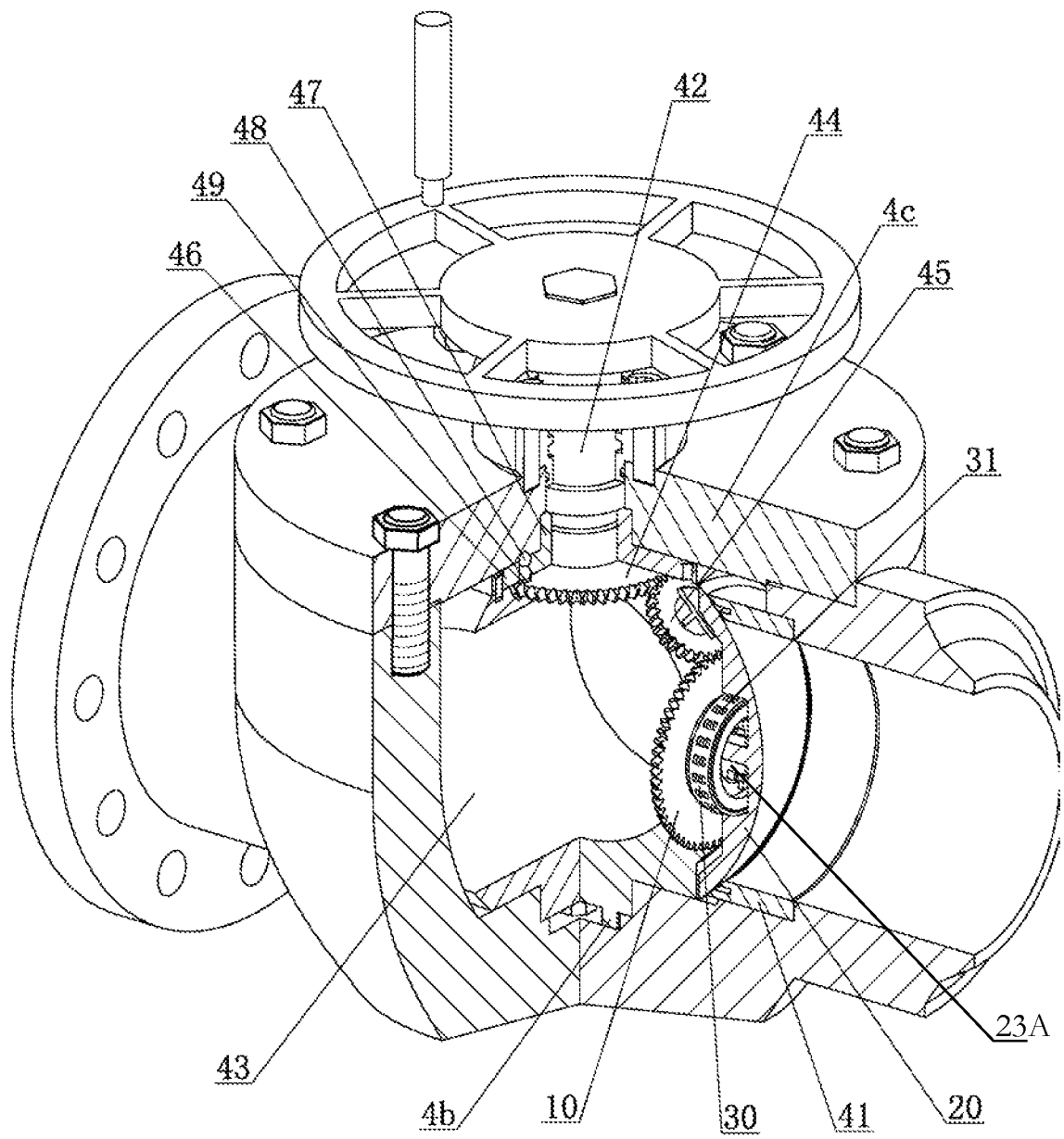
FIG. 9 is a structural view of the present disclosure in a forced seal ball valve.

As shown in FIG. 9, the cage reset planetary roller screw device is disposed in a forced seal ball valve including a seat 41 and a ball assembly. The ball assembly includes a ball 43 and a sealing member 20. The ball is provided with a screw driving wheel, and the screw driving wheel is driven via the cage reset planetary roller screw device to press the sealing member against the seat.

Figure 11:
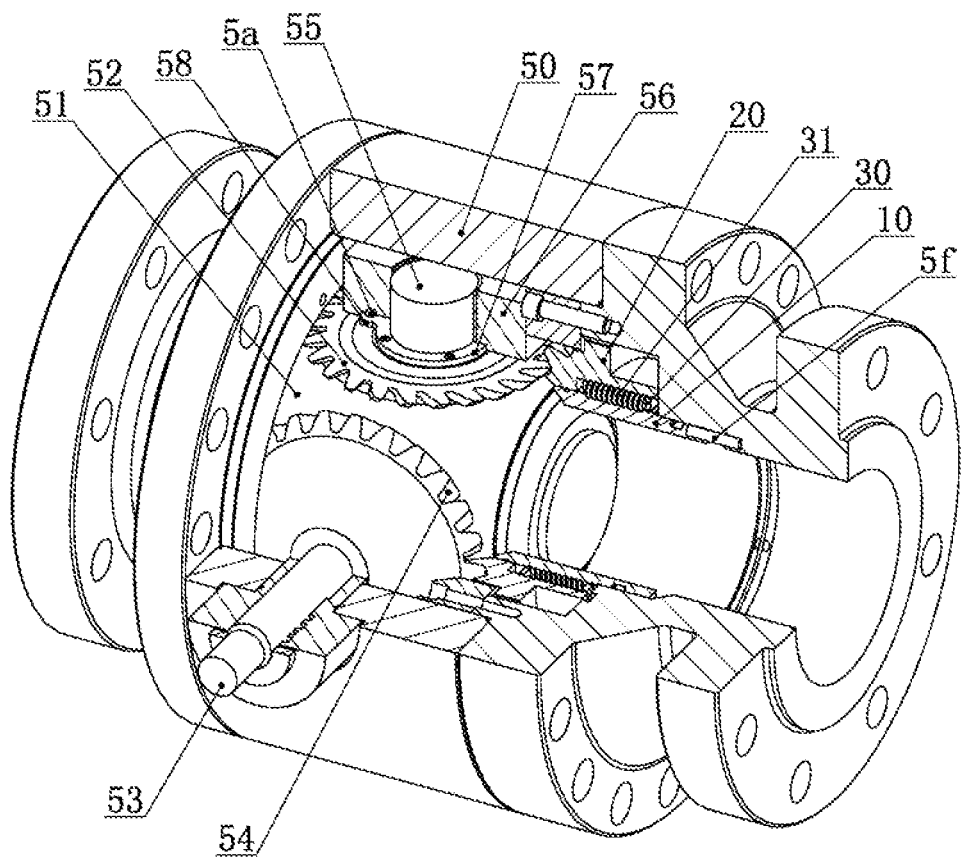
FIG. 11 is a structural view of the present disclosure in a side stem forced seal ball valve.

As shown in FIG. 11, as another application, the cage reset planetary roller screw device is disposed in a forced seal ball valve; the forced seal ball valve includes a ball, a first seat and a first driving wheel. The first driving wheel drives the first seat to press against the ball through the cage reset planetary roller screw device.

Embodiment 1

As shown in FIGS. 1 to 3, a cage reset planetary roller screw device includes a male thread member 10 provided with a male thread 11 and a female thread member 20 provided with a female thread 21. The male and female threads have the same pitch. In this embodiment, the male thread member rotates against the female thread member and thus, the female thread member moves in the axial direction. The stroke where the female thread member moves in a direction away from the male thread member is a load-bearing stroke (refer to FIG. 6), that is, the male thread member exerts a force on the female thread member when it rotates, so that the female thread member has to move against the external force. The movement stroke where the female thread member moves toward the male thread member is a non-loading stroke (refer to FIG. 7), that is, when the male thread member rotates, it only drives the female thread member itself, and even pushes the female thread member toward the male thread member. The distance that the female thread member possibly moves in the axial direction is limited, not greater than the pitch of the male or the female thread and usually only about one-half of the pitch.

A number of planetary rollers 31 are disposed between the male thread and the female thread. The planetary rollers are provided with ring grooves 32 whose groove distance t is the same as the pitch. The ring grooves of the planetary rollers respectively mesh with the male thread and the female thread. The planetary rollers are disposed between the male thread and the female thread via the cage, and are disposed in the roller retaining pockets 33 of the cage. The length K of the roller retaining pockets is slightly larger than the length K1 of the planetary rollers, so that there is a gap of approximately 0.2 mm left between each roller retaining pocket and the both ends of the corresponding planetary roller, allowing the planetary rollers to freely rotate in the roller retaining pockets without moving incorrectly in the axial direction. Experiments have shown that the movement of the cage can be made smoother by controlling the gap between the roller retaining pockets and the ends of the planetary rollers.

The two sides of the cage are the first side surface 34 and the second side surface 35 respectively. The first side surface and the second side surface of the cage are spiral surfaces. The spiral surfaces of the first side surface and the second side surface correspond to the male thread or the female thread. The spiral surface of the first side surface forms a first convex end 36 at the position where a round of rotation ends, and the spiral surface of the second side surface forms a second convex end 37 at the position where a round of rotation ends. The width of the first convex end and of the second convex end is equal to the pitch of the male thread or the female thread. The first convex end and the second convex end are opposite in the circumferential direction of the cage.

The male thread member is provided with a first limit block 12 which is a pin that protrudes from the male thread member. The female thread member is provided with a second limit block 22, which is also a pin that protrudes from the female thread member. The first limit block of the male thread member touches the first convex end in the circumferential direction of the cage, and the second limit block of the female thread member touches the second convex end in the circumferential direction of the cage. In fact, the first side surface of the cage and the first convex end are the counterparts of the second side surface and the second convex end; the two side surfaces of the cage are exchangeable with the same structure and function.

In this embodiment, the nearest position that the female thread member can be moved axially to the male thread member is considered as the initial working position (as shown in FIG. 1). The first limit block 12 of the male thread member is in contact with (or nearly in contact with) the first convex end 36 of the cage, while the second limit block 22 of the female thread member is in contact with (or nearly in contact with) the second convex end 37 of the cage.

Figure 6:
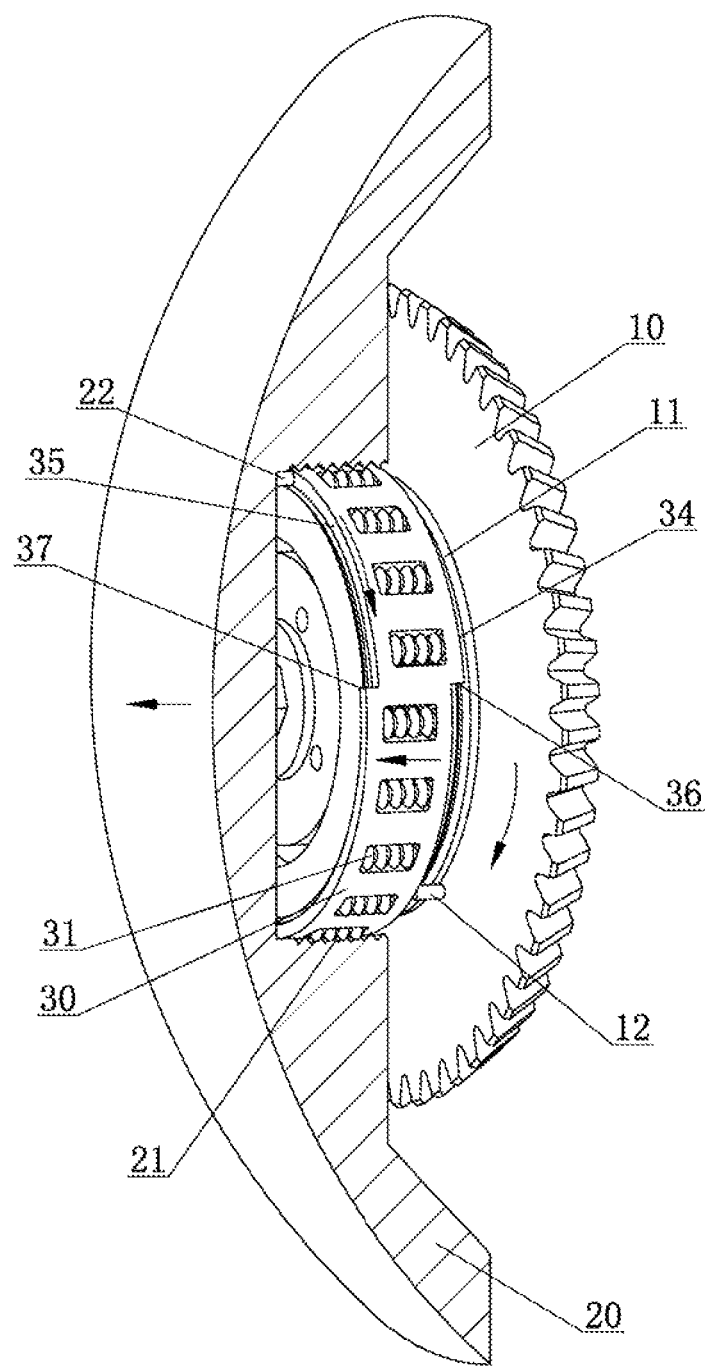
FIG. 6 is a schematic view of the operation of the present disclosure, the male thread member rotates and pushes the female thread member to rotate under load.

When the male thread member rotates and drives the female thread member to move during the load-bearing stroke, as shown in FIG. 6, the male thread transmits movement to the female thread through the planetary rollers, reducing the frictional resistance and allowing the male thread member to drive the female thread member smoothly under external load. During this process, since the planetary rollers roll between the male thread and the female thread, the rotation of the cage is slower than the rotation of the male thread member and thus, the first limit block is gradually separated from the first convex end of the cage. Due to possible poor manufacturing precision and working environment, the theoretically expected pure rolling motion between the planetary rollers and the male thread and the female thread during the movement cannot be guaranteed. Consequently, the actual relative position of the rollers to the threads may be ahead of or behind the theoretical relative position.

Figure 7:
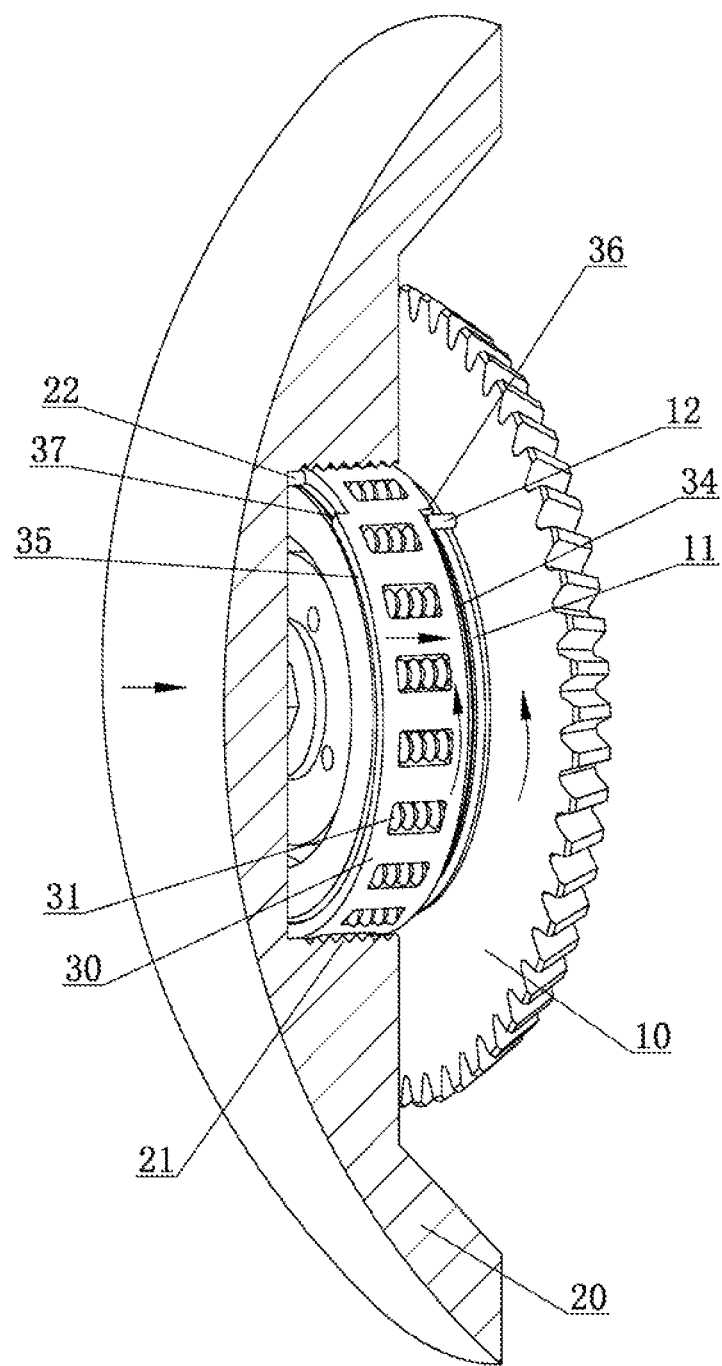
FIG. 7 is a schematic view of the operation of the present disclosure, the first limit block of the male thread member pushes the cage to rotate toward the initial working position.
Figure 8:
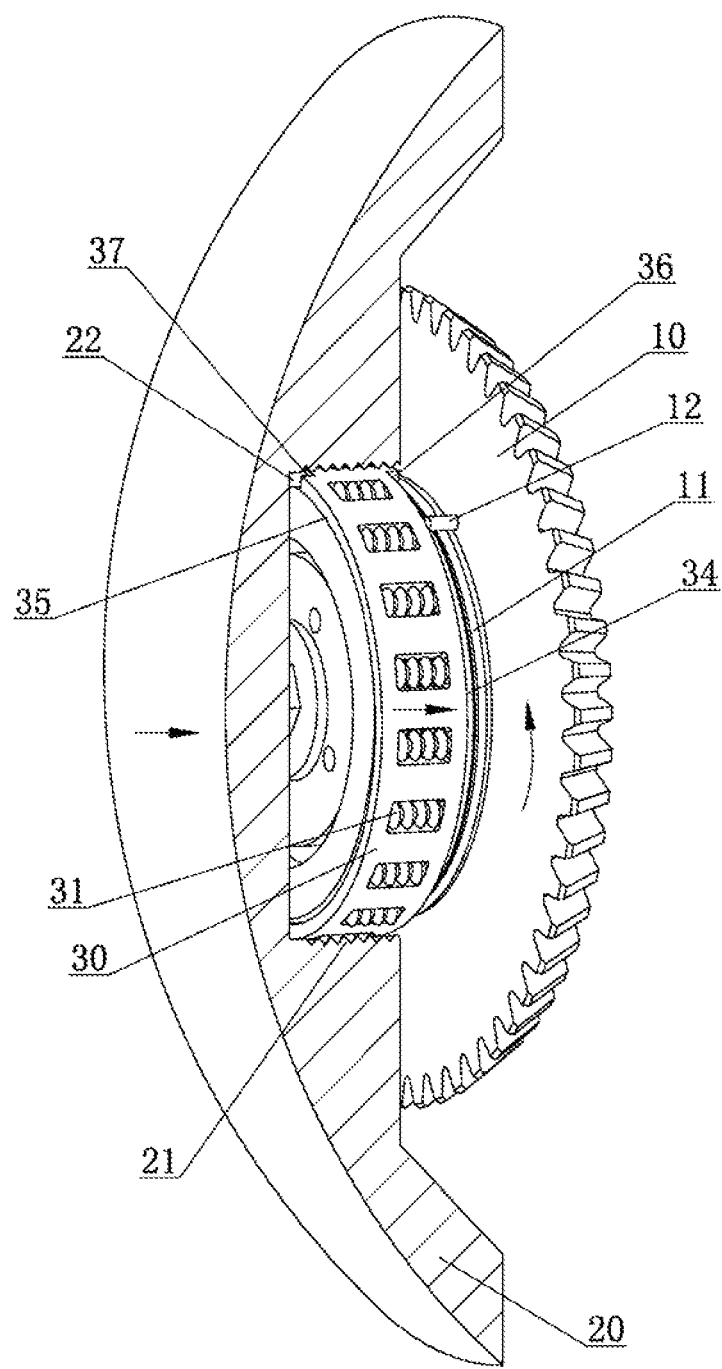
FIG. 8 is a schematic view of the operation of the present disclosure, the second limit block of the female thread member stops the cage at the initial working position.

Similarly, when the male thread member rotates to drive the female thread member during the non-loading stroke, as shown in FIG. 7, the planetary rollers may also be advanced or lagging behind in position when the male thread member rotates. If the movement of the planetary roller relative to the male thread member is lagging behind, as shown in FIG. 7, the first limit block 12 of the male thread member will push the cage to rotate. Since the stroke is non-loading, the planetary rollers slide between the male and female threads while rolling, and the cage and the planetary rollers return to the initial working position (as shown in FIG. 1). As shown in FIG. 8, if the planetary rollers move ahead of the male thread member, when the cage returns to the initial working position in the circumferential direction before the male thread member does, the second limit block of the female thread member stops the rotation of the cage. The cage and the planetary rollers will slide along the thread back to the initial working position. Thus, when a working cycle is completed, the cage will always return to the initial working position. Since the cage controls the cylindrical positions of the planetary rollers, the planetary rollers meshed with the female and the male threads can also accurately return to the initial working position.

The technical solution of the embodiment utilizes the characteristics that the male thread and the female thread carry a one-way rotational load. The cage is pushed to accurately reset the planetary rollers during the non-load rotation stroke, so that the planetary rollers maintain the correct working positions between the male thread and the female thread. This ensures the good working condition of the planetary roller screw device. The structure is simple and practically effective.

Embodiment 2

A cage reset planetary roller screw device. This embodiment is a structural simplification of the first embodiment. The cage may be a cage with a convex end on one side only.

As shown in FIG. 4, the two ends of the cage are respectively the first side surface 34 and the second side surface 35, where the first side surface of the cage is a spiral surface. The spiral surface of the first side surface corresponds to the male or the female thread. The end of the spiral surface of the first side surface forms a first convex end 36, with the width of the first convex end being equal to the pitch of the male or the female thread. The second side surface 35 is a flat surface with no convex end.

The male thread member is provided with a first limit block 12, which is a pin that protrudes from the male thread member. The first limit block of the male thread member touches the first convex end in the circumferential direction of the cage.

Based on actual engineering experience, for a specific set up and application environment, when the male thread member drives the female thread member through the planetary rollers, the planetary rollers will always tend to be ahead of or behind its expected position as they move toward the initial working position (i.e. during the non-loading stroke). If the planetary rollers always lag behind the male thread member as they move toward the initial working position, then this embodiment should be adopted. The structural complexity can therefore be reduced, and the manufacturing cost and maintenance cost saved.

Embodiment 3

A cage reset planetary roller screw device. This embodiment is a structural simplification of the first embodiment. The cage may be a cage with a convex end on one side only.

As shown in FIG. 5, the two ends of the cage are the first side surface 34 and the second side surface 35 respectively, where the first side surface of the cage is a spiral surface. The spiral surface of the first side surface corresponds to the male or the female thread. The end of the spiral surface of the first side surface forms a first convex end 36, with the width of the first convex end being equal to the pitch of the male or female thread. The second side surface 35 is a flat surface with no convex end.

The female thread member is provided with a first limit block 22, which is a pin that protrudes from the female thread member. The first limit block of the female thread member touches the first convex end in the circumferential direction of the cage.

Based on actual engineering experience, for a specific set up and application environment, when the male thread member drives the female thread member through the planetary rollers, the planetary rollers will always tend to be ahead of or behind its expected position as they move toward the initial working position (i.e. during the non-loading stroke). If the planetary roller is always ahead of the male thread member as they move toward the initial working position, then this embodiment should be adopted. The structural complexity can therefore be reduced, and the manufacturing cost and maintenance cost saved.

Embodiment 4

Figure 10:
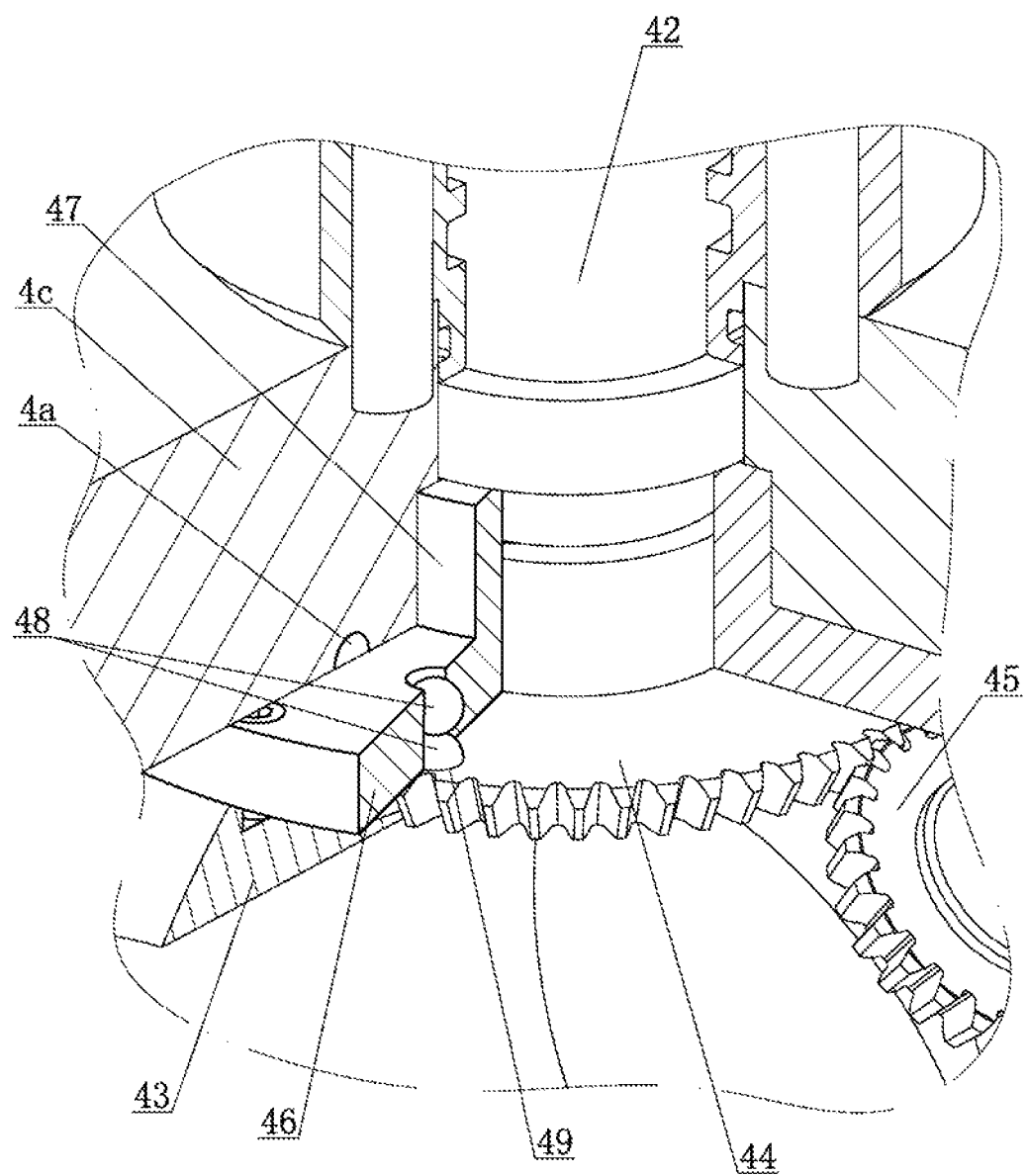
FIG. 10 is a structural view of the ball driven mechanism in the forced seal ball valve shown in FIG. 9.

As shown in FIGS. 9 and 10, a cage reset planetary roller screw device is disposed in the forced seal ball valve. The forced seal ball valve comprises a seat 41, a ball assembly and a stem 42. The ball assembly comprises a ball 43 and a sealing member 20. The ball is provided with a screw driving wheel 10; the screw driving wheel drives the sealing member inward and outward via screw connection. The stem drives a stem gear 44 to rotate. The stem gear drives the screw driving wheel to rotate through the intermediate gear 45. The upper part of the ball is provided with a stem gear protection cover 46 which is fixedly connected with the ball. The stem gear protection cover is provided with a ball rotating shaft 47. The ball rotates about the rotating shaft and the rotating shaft of the stem gear is coaxial with the ball rotating shaft. The protection cover is provided with a through hole. The through hole is provided with a locking object 48. The locking object is two spherical objects. A first recessed hole 49 is disposed at a corresponding position on the upper surface of the stem gear, and a second recessed hole 4a is disposed at a corresponding position of the upper cover 4c of the valve body. The locking object can fit in the space formed by the above-mentioned through hole and the first recessed hole or in the space formed by the above-mentioned through hole and the second recessed hole. When the locking object fits in the space formed by the through hole and the first recessed hole (as shown in FIG. 10), the stem gear can rotate the ball between the open and closed positions via the locking object. When the ball is rotated to the closed position (as shown in FIG. 9), the through hole, the first recessed hole and the second recessed hole are aligned, and the ball is stopped by the lower trunnion stop 4b. Therefore, the locking object fits into the space formed by the through hole and the second recessed hole to lock the ball in the closed position. The center of the sealing member is provided with a hexagonal rod/protrusion 23, and the ball is provided with a hexagonal hole/recess 23A (see FIG. 9) corresponding to the hexagonal rod of the sealing member. The hexagonal rod of the sealing member is slideably engaged with the hexagonal hole of the ball to allow the sealing member to linearly move back and forth with respect to the valve body. When the ball valve is in the open position, the sealing member is in contact with the ball, and the sealing member and the ball form a common spherical surface.

During the closing of the ball valve, the locking object locks the stem gear with the ball. The stem starts to rotate the ball together with the sealing member at the same time. When the ball rotates to the closed position, the ball stops rotating and the locking object releases the locking relationship between the stem gear and the ball. The stem drives the stem gear 44 to continue to rotate. The stem gear drives the screw driving wheel to rotate. The sealing member is pressed against the seat to achieve the forced sealing of the ball valve. During the opening of the ball valve, the stem gear first drives the sealing member to move away from the seat. When the sealing member retracts to the position that's in contact with the ball, the stem gear drives the ball to rotate toward the opening direction through the screw driving wheel and the sealing member. At this moment, the locking object also re-locks the stem gear with the ball until the ball is rotated to the open position.

During the closing operation, the sealing member is under the pressure of the pipe medium and the load of pressing the seat. The thread of screw driving wheel and the sealing member need to handle this load. However, during the opening operation, the screw driving wheel and the sealing member only need to take the minimal load caused by their own rotation.

In order to reduce the operating torque of the stem during valve operations, the screw driving wheel drives the sealing member through a planetary roller mechanism. The conventional planetary roller screw device requires a rail change slot. For a forced seal ball valve, the sealing member only moves within a small distance range, and experiences a minimal rotation angle while driving the sealing member. In this embodiment, the rotation of the screw driving wheel to drive the sealing member is no more than 180°. Thus, the rail change slot is no longer a necessary structure.

According to applications and experiments, the issue of the planetary roller screw device in the forced sealing ball valve is that during the back-and-forth rotation of the planetary roller screw device, due to poor manufacturing precision and working environment, the precise positional relationship between the planetary rollers and the male and the female threads cannot be maintained. That is, each time the ball is rotated to the open position, the planetary rollers cannot be restored to the same position. The accumulated offset caused by multiple rotations produces an axial offset in the planetary rollers against the cage. When such axial offset is accumulated to a certain extent, the cage will press the male or the female threads hindering their normal rotation and even causing failures of the ball valve.

In order to solve this technical problem, the forced seal ball valve of the present embodiment adopts the cage reset planetary roller screw device of the first embodiment.

As shown in FIGS. 1 to 3, in the present embodiment, the screw driving wheel 10 is a male thread member provided with a male thread 11 as in the first embodiment, and the sealing member 20 is the female thread member provided with female thread 21 as in the first embodiment. As described in the first embodiment, a number of planetary rollers 31 are disposed between the male thread and the female thread. The planetary rollers are disposed between the male and the female threads through the cage 30, and are held in the roller retaining pockets 33.

The planetary rollers 31 has a clearance fit with the male thread 11 and the female thread 21, that is, when the planetary roller screw is not subjected to a load, the planetary rollers can rotate or slide between the male thread and the female thread.

In this embodiment, when the ball valve is in the open position, the planetary roller screw device is in the initial working position. The sealing member 20 (the female thread member) is in contact with the ball, and the screw driving wheel 10 (the male thread member) cannot continue to drive the sealing member further toward the ball. At this moment, the planetary rollers and the cage are axially centered at the female and male threads.

In the stroke in which the screw driving wheel 10 (the male thread member) drives the sealing member to press against the seat, the sealing member (the female thread member) moves away from the screw driving wheel (the male thread member). This is a load-bearing stroke.

In the stroke in which the screw driving wheel drives the sealing member toward the ball, the sealing member (the female thread member) moves in the direction approaching the screw driving wheel (the male thread member). This is a non-loading stroke. When the screw driving wheel rotates, it only needs to drive the sealing member to move itself.

The technical solution of the embodiment has the advantages that:

The male thread and the female thread only take one-direct stroke load to push the cage to accurately reset the planetary rollers during the non-load rotation stroke, so that the planetary rollers maintain the correct initial position between the male thread and the female thread. The accurate initial position ensures the good working condition of the planetary roller screw. The structure is simple and practically effective.

Also, according to the structural principle of the present embodiment, the screw driving wheel can also be designed as a female thread member provided with a female thread, and the sealing member can be designed as a male thread member provided with a male thread.

Embodiment 5

As shown in FIGS. 11 to 16, a cage reset planetary roller screw device is disposed in the forced seal ball valve. The forced sealing ball valve is a side stem forced seal ball valve, comprising a valve body 50, a first seat 10 and a ball 51. The first seat moves reciprocally to the direction of the ball and is pressed against the ball to achieve a forced sealing. The side stem forced seal ball valve is provided with a first driving wheel 20 for driving the movement of the first seat and a second driving wheel 52 for driving the rotation of the ball. The first driving wheel is coaxial with the seat. The first driving wheel drives the rotation of the second driving wheel. The first driving wheel is driven by a side stem 53.

The side stem is provided with a stem gear 54. The first driving wheel and the second driving wheel mesh. The stem gear drives the first driving wheel through gear mesh.

The ball is provided with a first rotating shaft 55, and is installed in the valve body through the first bearing block 56. The first rotating shaft is provided with a ball driving ring 57. The ball driving ring is disposed between the first bearing block and the ball. The ball driving ring is fixedly connected with the ball. The outer diameter of the ball driving ring is provided with a drive lever 58, and the drive lever is provided with a through hole 59. A locking ball 5a is placed in the through hole, where the thickness of the drive lever is smaller than the diameter of the locking ball. The second driving wheel is mounted on the ball driving ring. The second driving wheel is rotatably fit with the outer diameter of the ball driving ring, and is located between the drive lever and the ball. The first bearing block is provided with a first recessed hole 5b whose position corresponds to the through hole of the drive lever, and the second driving wheel is provided with a second recessed hole 5c whose position corresponds to the through hole of the drive lever. When the ball is in the closed position, the locking ball is located in the space formed by drive lever through hole and the first recessed hole to lock the ball in the closed position; when the ball is released from the closed position, the locking ball is located in the space formed by the through hole of the drive lever and the second recessed hole, locking the connection relationship between the second driving wheel and the ball drive ring, so that the second driving wheel drives the ball to rotate.

In this embodiment, the first driving wheel has a rotation stroke of no more than 180° in the opening or closing operations of the forced seal ball valve.

The second driving wheel is provided with a drive pin 5d. The ball is provided with a ring groove 5e. The drive pin of the second driving wheel is embedded in the ring groove of the ball, and drives to rotate the ball toward the opening direction.

The end of the first seat is provided with a pin 5f to make the first seat move along the seat axis within the valve body without rotating.

When the side stem forced seal ball valve is in the open position, the ball is in the open position. The locking ball is located in the space formed by the through hole of the drive lever and the second recessed hole, thereby locking the connection relationship between the second driving wheel and the ball drive ring. During the closing operation, the stem drives the first driving wheel to rotate. The first driving wheel drives the seat to move toward the ball, and the first driving wheel also drives the second driving wheel to rotate. The ball stops rotating when it reaches the closed position. The stem continues to rotate in the closing direction. The second driving wheel pushes the locking ball out of the second recessed hole. The locking ball enters the space formed by the through hole of the drive lever and the first recessed hole. The locking relationship between the second driving wheel and the ball drive ring is released, and the ball is locked in the closed position. At this point, the ball is aligned with the seat yet leaving a gap in between. The second driving wheel can idle on the ball drive ring, and the first driving wheel continues to drive the first seat to move, so that the first seat is pressed against the ball achieving a forced sealing. During the opening operation, the stem drives the first driving wheel to rotate in the opening direction. The first driving wheel drives the seat to move away from the ball, and the first driving wheel also drives the second driving wheel to rotate in the opening direction. The second driving wheel can idle on the ball drive ring while the ball is still locked in the closed position. After the first seat moves away from the ball, when the second recessed hole rotates to align with the drive lever through hole and the first recessed hole, the drive pin simultaneously pushes the ball to rotate in the opening direction, and the locking ball moves out from the first recessed hole. The locking ball enters into the space formed by the drive lever through hole and the second recessed hole, and rotates with the ball drive lever and the second driving wheel in the opening direction until the ball is turned to the open position.

The forced seal ball valve of this embodiment employs a cage reset planetary roller screw device.

The first driving wheel drives the seat through the cage reset planetary roller screw device. The planetary roller screw device includes a male thread member 10 provided with a male thread 11 and a female thread member 20 provided with a female thread 21. The male thread member in this embodiment is a seat 10, and the female thread member is the first driving wheel 20. This embodiment adopts the same planetary roller and cage structure as in the first embodiment.

A first limit block 13 is provided on the seat 10 (the male thread member), and the first limit block is a pin that protrudes from the seat. A second limit block 24 is provided on the first driving wheel 20 (the female thread member), and the second limit block is a block that protrudes from the end of the first driving wheel.

Figure 12:
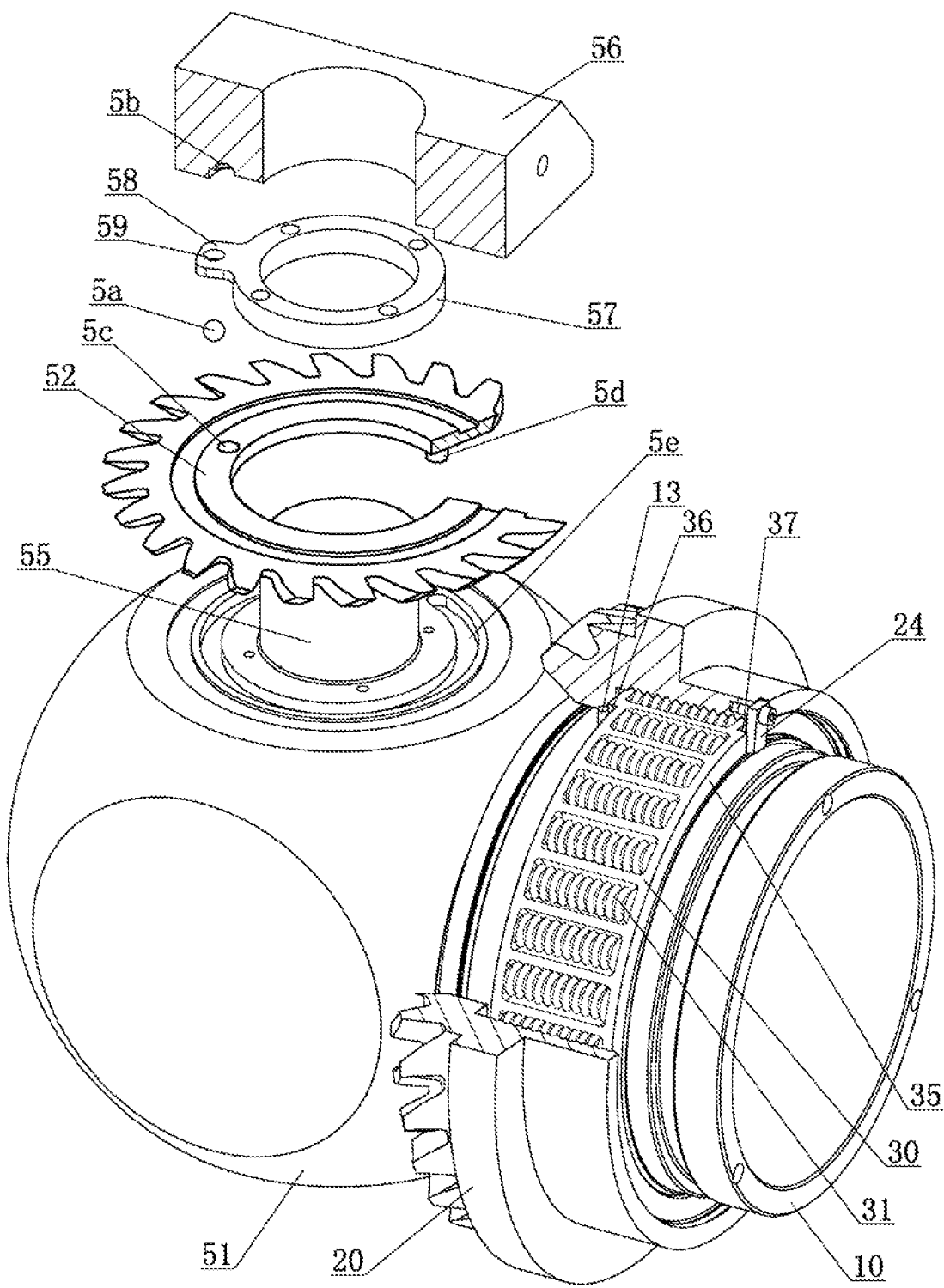
FIG. 12 is a structural view showing the ball and the seat mechanism of the side stem forced seal ball valve shown in FIG. 11.
Figure 13:
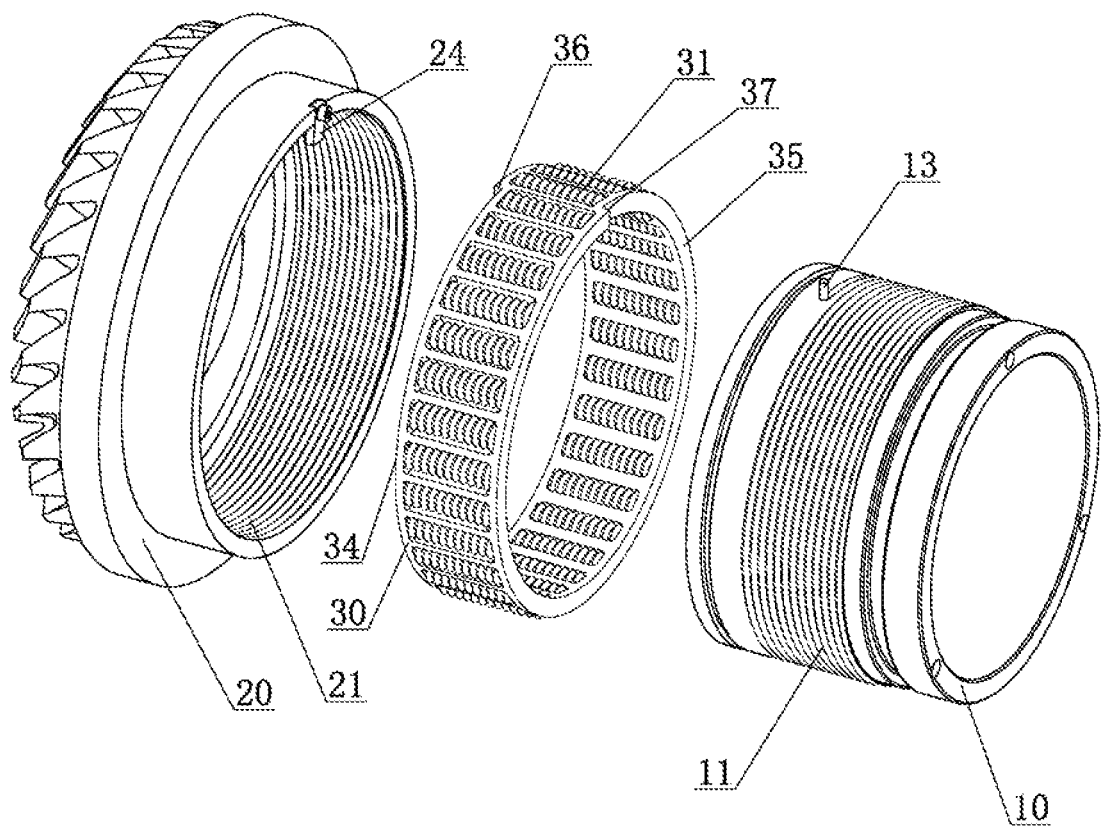
FIG. 13 is an exploded view showing the structure of the planetary roller screw device in the side stem forced seal ball valve shown in FIG. 11.
Figure 14:
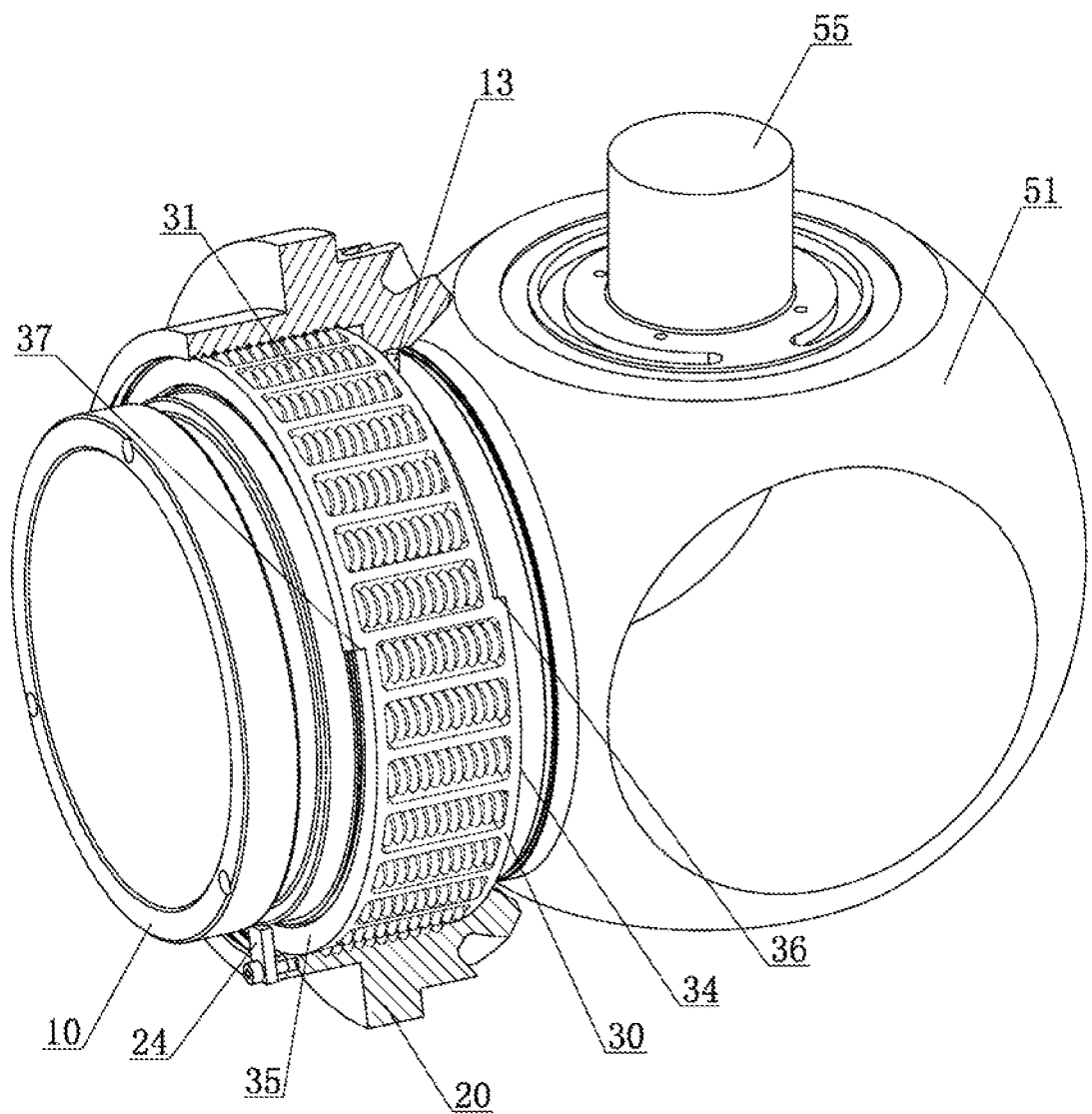
FIG. 14 is a schematic view showing the operation of the side stem forced seal ball valve shown in FIG. 11, with the first driving wheel and the cage rotated to the closed position.

When the ball valve is in the open position, the planetary roller screw device is in its initial working position, and the seat 10 is away from the ball. At this point, the planetary rollers and the cage are axially centered at the female and the male threads, as shown in FIG. 12. The first limit block 13 of the seat is in contact with (or close to) the first convex end 36 of the cage, while the second limit block 24 of the first driving wheel is in contact with (or close to) the second convex end 37 of the cage. During the closing of the forced seal ball valve, the ball rotates from the open position to the closed position, and stops rotating when it reaches the closed position. The first driving wheel continues to rotate, and the female thread of the first driving wheel drives the seat to move toward the ball via the planetary rollers and the male thread until the seat is pressed against the ball tightly, as shown in FIG. 14. As the planetary rollers roll between the male thread and the female thread, the rotation of the cage lags behind the rotation of the first driving wheel, and the second limit block is gradually separated from the second convex end of the cage. During this process, due to poor manufacturing precision and working environment, the theoretically pure rolling motion between the planetary rollers and the male and the female threads cannot be precisely guaranteed. The positional relationship between the rollers and the threads may be ahead or behind of the theoretical relationship.

Figure 15:
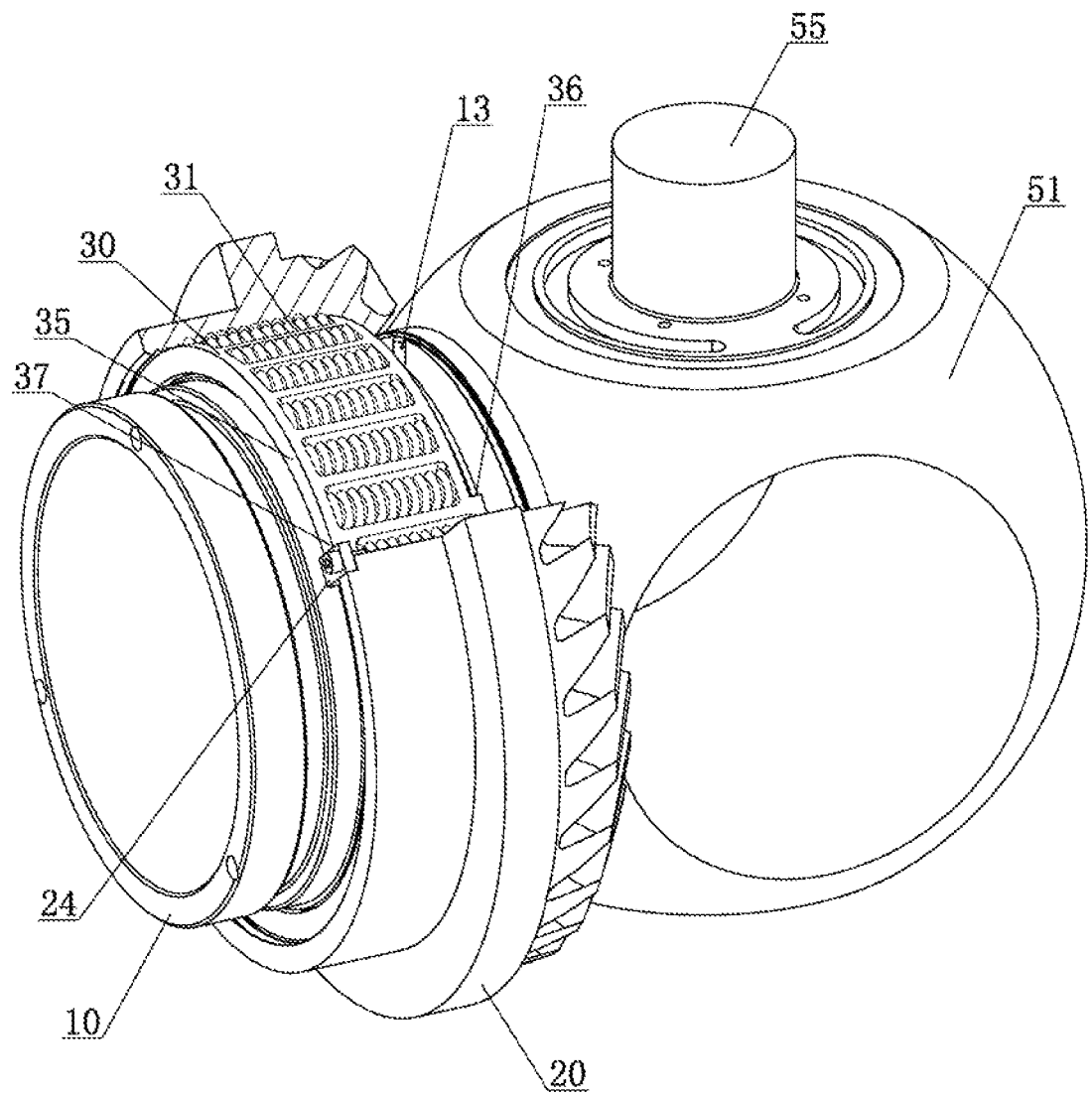
FIG. 15 is a schematic view of the operation of the present disclosure in a side stem forced seal ball valve, where the second limit block of the first driving wheel pushes the cage back to the initial working position.
Figure 16:
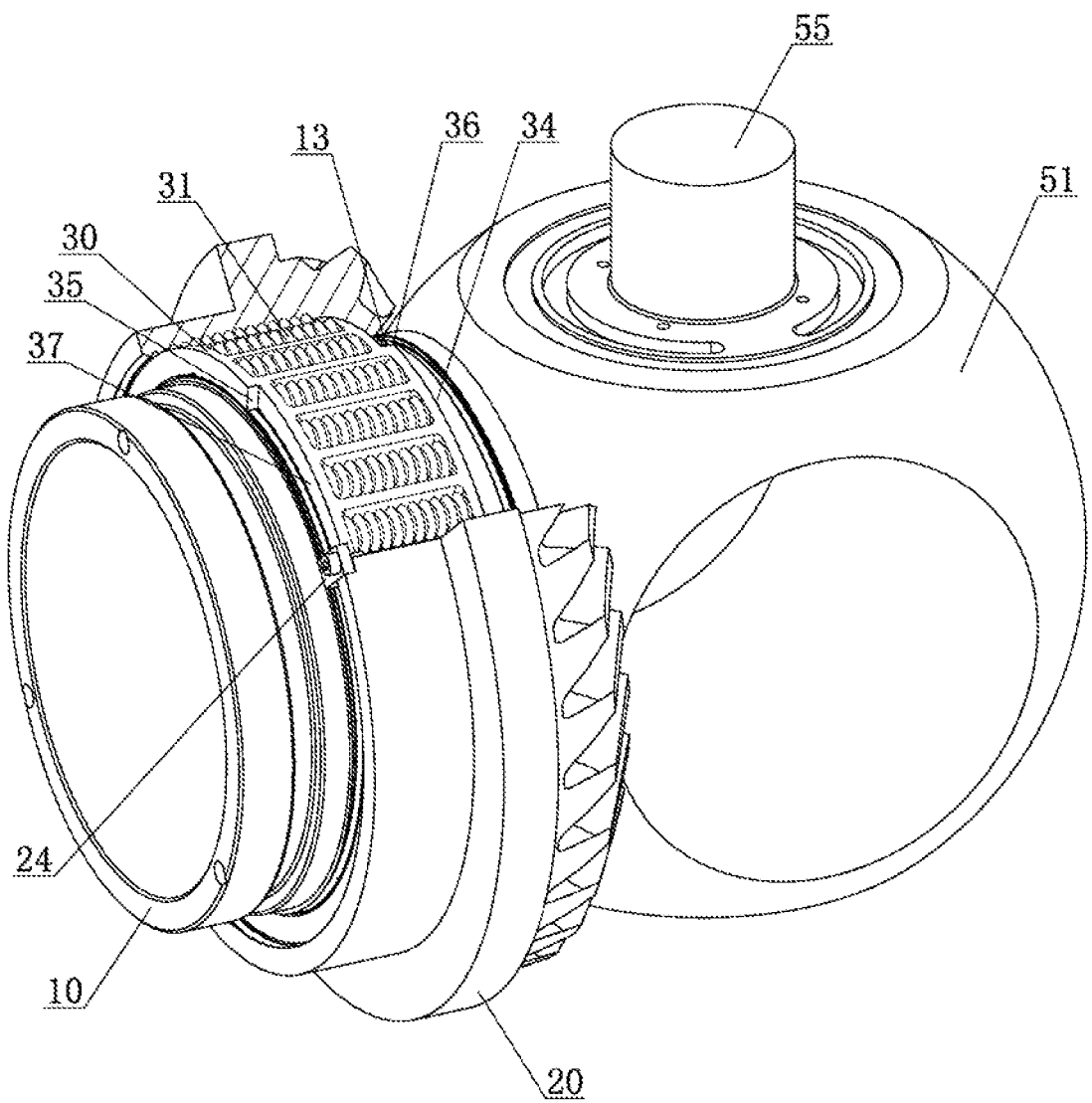
FIG. 16 is a schematic view of the operation of the present disclosure in a side stem forced seal ball valve, where the first limit block of the seat stops the cage at the initial working position.

During the opening process of the forced seal ball valve, the seat is driven away from the ball when the first driving wheel rotates. This is a non-loading rotation. Similarly, during the rotation of the first driving wheel, the planetary rollers may also move ahead or behind of their theoretical position. If the planetary rollers lag behind the first driving wheel, as shown in FIG. 15, the female thread limit block of the first driving wheel pushes the cage back to the initial working position. Since the opening process is non-loading rotation, the planetary rollers can slide in the gap between the male and female threads while rolling, so that the cage will drive the planetary rollers back to the initial working position. If the planetary roller moves ahead of the first driving wheel, the first limit block of the seat will stop the cage at the initial working position as shown in FIG. 16. The first driving wheel continues to rotate, and the female thread of the first driving wheel pushes the planetary rollers back to the initial working position.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A threaded mechanism for creating reliable axial movement, the threaded mechanism comprising:
   a male threaded member;
     the male threaded member including a first limit block;
   a female threaded member;
     the female threaded member including a second limit block;
   a set of rollers;
     the set of rollers placed between the male threaded member and the female threaded member;
     each roller of the set of rollers meshing with the male threaded member and the female threaded member;
   a roller cage partially surrounding the set of rollers;
     the roller cage limited in rotation by the first limit block and the second limit block;
   whereby rotation of the male threaded member with respect to the female threaded member, or vice versa, causes linear movement of the male threaded member with respect to the female threaded member.

2. The threaded mechanism of claim 1, wherein the roller cage further comprises:
   a first limit stop surface;
     the first limit stop surface preventing the roller cage from over-rotating in a first direction by contacting the first limit block;
   a second limit stop surface;
     the second limit stop surface preventing the roller cage from over-rotating in a second direction by contacting the second limit block.

3. The threaded mechanism of claim 1, further comprising:
   a valve body;
   a ball;
     the ball rotatably interfaced to the valve body;
     the ball including a recess;
   a protrusion projecting outwardly from the female threaded member;
     the protrusion interfacing with the recess;
   wherein the protrusion can slide with respect to the recess, but cannot rotate.

4. The threaded mechanism of claim 1, further comprising:
   a ball assembly, the ball assembly including a ball and a sealing member, the ball assembly having an open position and a closed position;
   a first valve stem, the first valve stem causing both rotation of the ball and motion of the male threaded member;
   a valve seat;
   wherein when the ball assembly is in the open position, rotation of the first valve stem first rotates the ball to the closed position, and then causes the male threaded member rotate, causing the female threaded member to translate, thus causing the sealing member to press against the valve seat.

5. The threaded mechanism of claim 1, further comprising:
   a sealing member;
     the sealing member is an extension of the female threaded member.

6. A threaded mechanism that uses a roller cage, the threaded mechanism comprising:
   a first threaded member;
     the first threaded member able to rotate, but prevented from moving inwardly or outwardly;
   a second threaded member;
     the second threaded member prevented from rotating, but able to move inwardly or outwardly;
   a set of rollers placed between the first threaded member and the second threaded member;
   the roller cage partially surrounding each roller of the set of rollers;
   the roller cage able to rotate with respect to the second threaded member, but rotation of the roller cage is limited to a set angular distance;
   whereby limiting the rotation of the roller cage correspondingly limits movement of the roller cage along an axis of the first threaded member.

7. The threaded mechanism of claim 6, wherein the roller cage further comprises:
   a first limit stop surface;
     the first limit stop surface preventing the roller cage from over-rotating in a first direction by a first limit block;
   a second limit stop surface;
     the second limit stop surface preventing the roller cage from over-rotating in a second direction by a second limit block.

8. The threaded mechanism of claim 6, further comprising:
   a valve body;
   a ball;
     the ball rotatably interfaced to the valve body;
     the ball including a recess;
   a protrusion projecting outwardly from the second threaded member;
     the protrusion interfacing with the recess;
   wherein the protrusion can slide with respect to the recess, but cannot rotate.

9. The threaded mechanism of claim 6, further comprising:
   a ball assembly, the ball assembly including a ball and a sealing member, the ball assembly having an open position and a closed position;
   a first valve stem, the first valve stem causing both rotation of the ball and motion of the first threaded member;
   a valve seat;
   wherein when the ball assembly is in the open position, rotation of the first valve stem first rotates the ball to the closed position, and then causes the first threaded member rotate, causing the second threaded member to translate, thus causing the sealing member to press against the valve seat.

10. The threaded mechanism of claim 6, further comprising:
 a sealing member;
  the sealing member is an extension of the second threaded member.

* * * * *